UNITED STATES PATENT OFFICE.

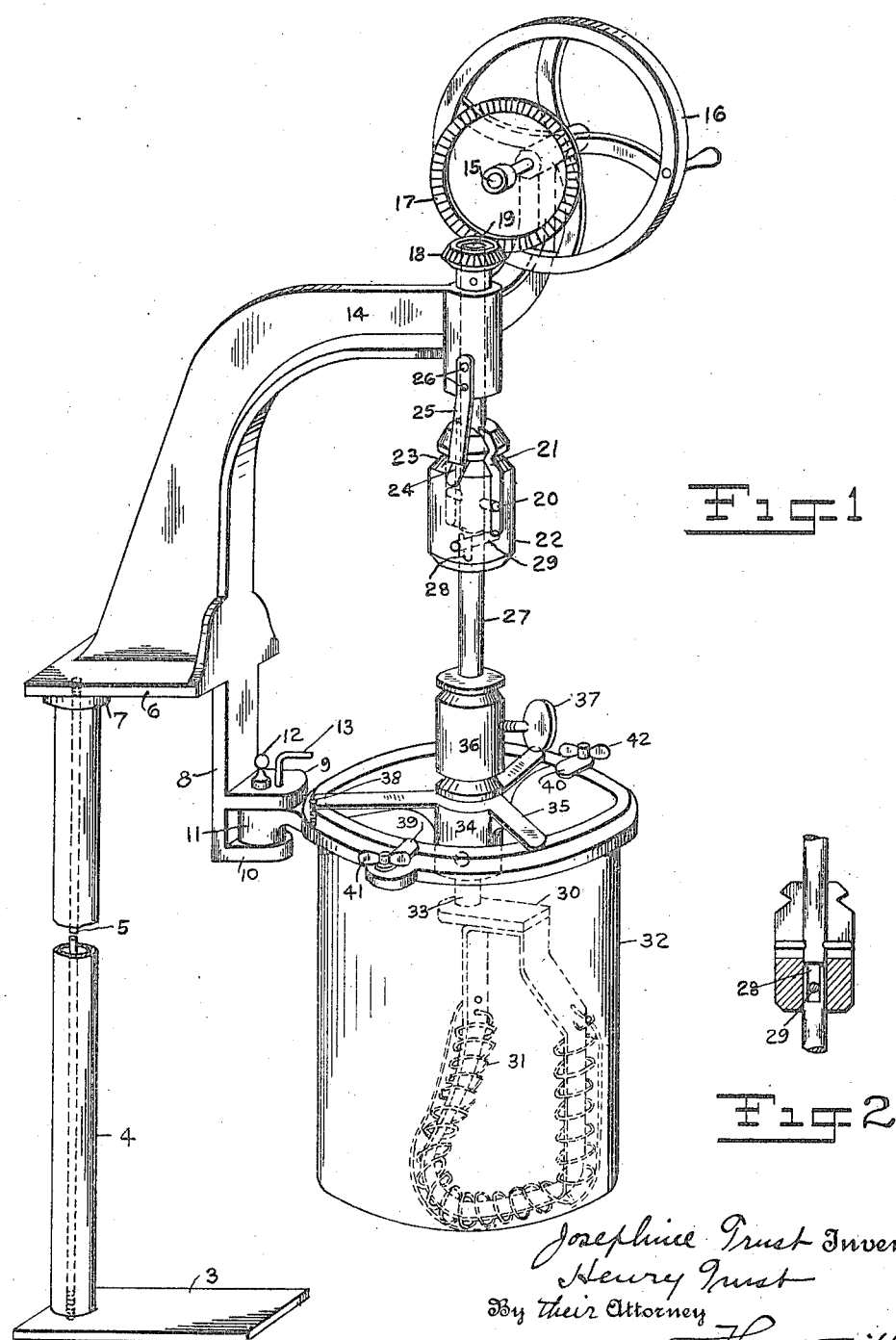

JOSEPHINE TRUST AND HENRY TRUST, OF BROOKLYN, NEW YORK.

TOOL-HOLDING MEANS OF FOOD-MACHINES.

1,255,356.      Specification of Letters Patent.      Patented Feb. 5, 1918.

Application filed May 17, 1917. Serial No. 169,170.

*To all whom it may concern:*

Be it known that we, JOSEPHINE TRUST and HENRY TRUST, citizens of the United States, residing at borough of Brooklyn, in the county of Kings and State of New York, have invented certain new and useful Improvements in Tool-Holding Means of Food-Machines, of which the following is a specification, reference being had therein to the accompanying drawing.

Our invention relates to improvements in beating and mixing machines and has particular reference to and is illustrated in the accompanying drawings in its application to the tool or beater engaging means in a machine especially adapted for beating and mixing mayonnaise and various other food products.

Referring to the accompanying drawings, Figure 1 illustrates in perspective with parts broken away a machine embodying an application of our invention. Fig. 2 is a cross-sectional view partly broken away illustrating the clutch or beater holder mechanism.

3 indicates the base of the machine, and 4 the standard thereof which preferably comprises a suitable tube or pipe within which is secured a smaller tube or rod 5 which is screwed into the base 3 at one end and into the bracket 6 at the other end, drawing the bracket and base together upon the outer tube or pipe 4 which may be provided with a collar such as 7.

Depending from the bracket 6 is a bracket 8 provided with offsets 9—10 between which a carrier 11 may be secured upon the pin 12 so as to swing laterally and may be provided with a hole to be engaged by a pin such as 13 to secure the carrier in operative position.

14 indicates the top bracket of the machine which is provided with a spindle 15 having secured thereto the hand-wheel 16 and beveled gear 17 which meshes with the beveled pinion 18 upon the spindle 19 which is provided with the cross pin 20 adapted to pass through the slot 21 into the chuck or holder 22, said chuck or holder 22 being provided with a cut-away portion 23 to receive the ledge 24 of the spring catch 25 secured at the other end to the top bracket 14 by rivets or screws such as 26.

27 indicates another spindle preferably forked at the top as indicated at 28 to receive the pin 29 of the chuck 22, from which it will be seen that the chuck 22 is held upon the drive spindle 19 by the engaging catch 25 so that when the tool spindle 27 is held in the chuck 22 the same is rotated thereby.

The base of the tool spindle is secured to the beater 30 comprising a suitable strap of material bent substantially as shown and preferably provided with a coil of wire such as 31 which strips the bottom and side of the container 32, thereby beating or mixing the contents therein. This is retained by the spindle 33 secured within the holder 34 provided with the spider 35 held within the sleeve 36 retained upon the work spindle 27 by any suitable means such as the thumb screw 37, and 38 indicates a pin or other suitable means for retaining the spider 35 in position upon the carrier 11, said carrier also being preferably provided with binders such as 39—40 attached thereto by suitable means such as the wing-nuts 41—42.

Of course it will be understood that various modifications may be made in the construction and arrangement of parts without departing from the spirit of the invention as claimed.

We claim:

1. In a machine of the class described, a driving spindle and chuck in combination therewith, means for retaining the chuck upon said spindle, engaging means upon said spindle, said chuck having a cut-away portion within which said engaging means is adapted to be seated.

2. In a machine of the class described, a driving spindle and chuck in combination therewith, means for retaining the chuck upon said spindle, engaging means upon said spindle, a cut away in said chuck having a cut-away portion within which said engaging means is adapted to be seated, a tool spindle provided with a forked end and a pin within said chuck adapted to engage the forked end of said tool spindle.

In testimony whereof we hereunto affix our signatures in the presence of two witnesses.

JOSEPHINE TRUST.
           HENRY TRUST.

Witnesses:
    ETHEL GARDNER,
    ANNA F. DUFFY.